(12) United States Patent
Shamaie

(10) Patent No.: US 9,898,689 B2
(45) Date of Patent: Feb. 20, 2018

(54) NONPARAMETRIC MODEL FOR DETECTION OF SPATIALLY DIVERSE TEMPORAL PATTERNS

(71) Applicant: QUALCOMM Incorporated, San Diego, CA (US)

(72) Inventor: Atid Shamaie, Toronto (CA)

(73) Assignee: Qualcomm Incorporated, San Diego, CA (US)

( * ) Notice: Subject to any disclaimer, the term of this patent is extended or adjusted under 35 U.S.C. 154(b) by 22 days.

(21) Appl. No.: 14/933,976

(22) Filed: Nov. 5, 2015

(65) Prior Publication Data

US 2016/0132753 A1    May 12, 2016

Related U.S. Application Data

(60) Provisional application No. 62/076,319, filed on Nov. 6, 2014.

(51) Int. Cl.
| | | |
|---|---|---|
| *G06K 9/36* | (2006.01) | |
| *G06K 9/62* | (2006.01) | |
| *G06K 9/00* | (2006.01) | |
| *G06K 9/66* | (2006.01) | |

(52) U.S. Cl.
CPC ....... *G06K 9/6297* (2013.01); *G06K 9/00402* (2013.01); *G06K 9/6202* (2013.01); *G06K 9/6218* (2013.01); *G06K 9/6255* (2013.01); *G06K 9/66* (2013.01); *G06K 2209/01* (2013.01)

(58) Field of Classification Search
CPC ........... G06N 7/023; G06N 99/005; G06N 2207/20081; G06N 3/04; G06N 3/0409; G06N 3/0418; G06N 3/0427; G06N 3/0436; G06N 3/0445; G06N 3/0454; G06N 3/0463; G06N 3/0472; G06N 3/0481; G06N 3/049; G06N 3/06
See application file for complete search history.

(56) References Cited

U.S. PATENT DOCUMENTS

| | | |
|---|---|---|
| 7,263,472 B2 | 8/2007 | Porikli |
| 9,122,931 B2 | 9/2015 | Peng et al. |
| 2005/0285937 A1 | 12/2005 | Porikli |
| 2011/0041100 A1 | 2/2011 | Boillot |

(Continued)

OTHER PUBLICATIONS

Bargi A., et al., "An online HDP-HMM for joint action segmentation and classification in motion capture data," Computer Vision and Pattern Recognition Workshops (CVPRW), 2012 IEEE Computer Society Conference on IEEE, 2012, 7 pages.

(Continued)

*Primary Examiner* — Duy M Dang
(74) *Attorney, Agent, or Firm* — Qualcomm Incorporated/ Seyfarth Shaw LLP

(57) ABSTRACT

A computer-implemented method of generating a spatio-temporal pattern model for spatio-temporal pattern recognition includes receiving one or more training trajectories. Each of the training trajectories includes diverse data points that represent a spatio-temporal pattern. The received training trajectories define an area that is partitioned into one or more observed clusters, and a unpopulated complementary cluster. The spatio-temporal pattern model is generated so as to include both of the observed clusters and the unpopulated complementary cluster.

24 Claims, 13 Drawing Sheets

(56) References Cited

U.S. PATENT DOCUMENTS

2012/0163463 A1 6/2012 Edelhaeusser et al.
2015/0287214 A1 10/2015 O'Gorman et al.

OTHER PUBLICATIONS

Bishop C.M., "Pattern recognition and machine learning," springer, 2006, 703 pages.
Zheng J., et al., "Spatio-temporal Unified Model for on-line Handwritten Chinese Character Recognition," Document Analysis and Recognition, 1999. ICDAR '99. Proceedings of the Fifth International Conference on Bangalore, India Sep. 20-22, 1999, Los Alamitos, CA, USA,IEEE Comput. Soc, US, Sep. 20, 1999 (Sep. 20, 1999), pp. 649-652, XP010351328, ISBN: 978-0-7695-0318-9.
Ellis D., et al., "Modelling Pedestrian Trajectory Patterns with Gaussian Processes", Computer Vision Workshops (ICCV Workshops), IEEE 12th International Conference on. IEEE, 2009, 6 Pages.
Elmezain M., et al., "Improving Hand Gesture Recognition Using 3D Combined Features," Machine Vision, 2009. ICMV '09. Second International Conference on, IEEE, Piscataway, NJ, USA, Dec. 28, 2009 (Dec. 28, 2009), pp. 128-132, XP031610618, ISBN: 978-0-7695-3944-7.
Fox E., et al., "Bayesian Nonparametric Covariance Regression", arXiv.org, preprint arXiv:1101.2017, 2011, pp. 1-33.
Fox E.B., et al., "An HDP-HMM for Systems with State Persistence", Proceedings of the 25th international conference on Machine learning, ACM, 2008, 8 Pages.
Fox E.B., et al., "The Sticky HDP-HMM: Bayesian Nonparametric Hidden Markov Models With Persistent States", MIT Laboratory for Information & Decision Systems Technical Report, Nov. 5, 2007, pp. 1-60.
Gauvain J-L., et al., "Bayesian learning of Gaussian mixture densities for hidden Markov models," 1991, pp. 272-277.
Gelman A., et al., "Bayesian Data Analysis", Third Edition, Chapman & Hall/CRC, London, 2014, vol. 2, pp. 1-640.
International Search Report and Written Opinion—PCT/US2015/059475—ISA/EPO—Jan. 18, 2016.
Ishwaran H., et al., "Gibbs sampling methods for stick-breaking priors," Journal of the American Statistical Association, Mar. 2001, vol. 96, No. 453, pp. 161-173.
Kim K., et al., "Gaussian process regression flow for analysis of motion trajectories," International Conference on Computer Vision (ICCV), 2011, 8 pages.
Neal R.M., "Markov chain sampling methods for Dirichlet process mixture models," Journal of computational and graphical statistics, 2000, vol. 9, No. 2, pp. 249-265.
Pitman J., et al., "The two-parameter Poisson-Dirichlet distribution derived from a stable subordinator," The Annals of Probability, 1997, vol. 25, No. 2, pp. 855-900.
Rasmussen C.E., "Gaussian Processes in Machine Learning", 2006, 9 pages.
Rasmussen C.E., "The Infinite Gaussian Mixture Model", in Advances in Neural Information Processing Systems, 2000, vol. 12, pp. 554-560.
Shamaie A., et al., "Bayesian Fusion of Hidden Markov Models for Understanding Bimanual Movements", Automatic Face and Gesture Recognition, 2004. Proceedings. Sixth IEEE International Conference on, May 2004, pp. 602-607.
Sudderth E.B., et al., "Shared segmentation of natural scenes using dependent Pitman—Your processes," Advances in Neural Information Processing Systems, 2008, 8 pages.
Sudderth E.B., "Graphical Models for Visual Object Recognition and Tracking", Massachusetts Institute of Technology, May 2006, pp. 1-301.
Teh Y.W, "A Hierarchical Bayesian Language Model based on Pitman—Yor Processes," Proceedings of the 21st International Conference on Computational Linguistics and the 44th Annual Meeting of the ACL , ACL '06, Jul. 16, 2006 (Jul. 16, 2006), pp. 985-992, XP055238660, Morristown, NJ, USA DOI: 10.3115/1220175.1220299.
Torbati A.H.H.N., et al., "A Left-to-Right HDP-HMM with HDPM Emissions", 48th Annual Conference on Information Sciences and Systems (CISS), Mar. 19, 2014, 6 Pages.
Wilpon J.G., et al., "Automatic Recognition of Keywords in Unconstrained Speech using Hidden Markov Models", IEEE Transactions on Acoustics, Speech and Signal Processing, IEEE Inc. New york, USA, Nov. 1, 1990 (Nov. 1, 1990), vol. 38, No. 11, pp. 1870-1878, XP000171007, ISSN: 0096-3518, DOI: 10.1109/29.103088 the whole document.

NONPARAMETRIC MODEL FOR DETECTION OF SPATIALLY DIVERSE TEMPORAL PATTERNS

CROSS-REFERENCE TO RELATED APPLICATION

The present application claims the benefit of U.S. Provisional Patent Application No. 62/076,319, filed on Nov. 6, 2014, and titled "NONPARAMETRIC MODEL FOR DETECTION OF SPATIALLY DIVERSE TEMPORAL PATTERNS," the disclosure of which is expressly incorporated by reference herein in its entirety.

BACKGROUND

Technical Field

Certain aspects of the present disclosure generally relate to machine learning and, more particularly, to improving systems and methods of detecting spatially diverse temporal patterns.

Background

Mobile devices, such as cell phones or personal digital assistants (PDAs), have several functions, each of which may be activated through the user selection of a unique sequence of keys or using on-screen menus. As mobile devices offer increased feature sets, accessing all of the features may become increasingly complex given a limited number of controls capable of being provided on a mobile device.

Recently, some mobile devices have been designed to include the ability to receive user input through recognition of user-controlled gestures. Some devices may receive user-controlled gestures by way of a touch-screen interface, while other devices may be configured to receive user-controlled gestures by acquiring images and implementing a computer-vision approach to tracking user input. One important aspect of gesture recognition is the ability to recognize a known pattern in the resultant trajectory data. However, the appearance of or the method in which the input gesture is drawn or motioned often varies from user to user, or even varies each time it is drawn by the same user. For example, slight variations may exist in how different users draw a particular character (e.g., number "2"). Recognizing a pattern in the trajectory data remains a significant challenge due to these variations.

SUMMARY

In an aspect of the present disclosure, a computer-implemented method of generating a spatio-temporal pattern model for spatio-temporal pattern recognition is presented. The method includes receiving a plurality of training trajectories. Each of training trajectory including a plurality of diverse data points representative of a spatio-temporal pattern. The received training trajectories define an area. The method also includes partitioning the area into a plurality of observed clusters and a non-observed complementary cluster. The method further includes generating the spatio-temporal pattern model to include the observed clusters and the non-observed complementary cluster.

In another aspect of the present disclosure, an apparatus for generating a spatio-temporal pattern model for spatio-temporal pattern recognition is presented. The apparatus includes a memory and at least one processor coupled to the memory. The processor(s) is(are) configured to receive training trajectories. Each of the training trajectories includes diverse data points representative of a spatio-temporal pattern. The received training trajectories define an area. The processor(s) is(are) also configured to partition the area into observed clusters and a non-observed complementary cluster. The processor(s) is(are) further configured to generate the spatio-temporal pattern model to include the observed clusters and the non-observed complementary cluster.

In yet another aspect of the present disclosure, an apparatus for generating a spatio-temporal pattern model for spatio-temporal pattern recognition is presented. The apparatus includes means for receiving training trajectories. Each of the training trajectories includes diverse data points representative of a spatio-temporal pattern. The received training trajectories define an area. The apparatus also includes means for partitioning the area into observed clusters and a non-observed complementary cluster. The apparatus further includes means for generating the spatio-temporal pattern model to include the observed clusters and the non-observed complementary cluster.

In a further aspect of the present disclosure, a non-transitory computer readable medium is presented. The non-transitory computer readable medium has encoded thereon program code for generating a spatio-temporal pattern model for spatio-temporal pattern recognition. The program code is executed by a processor and includes program code to receive training trajectories. Each of the training trajectories includes diverse data points representative of a spatio-temporal pattern. The received training trajectories define an area. The program code also includes program code to partition the area into observed clusters and a non-observed complementary cluster. The program code further includes program code to generate the spatio-temporal pattern model to include the observed clusters and the non-observed complementary cluster.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
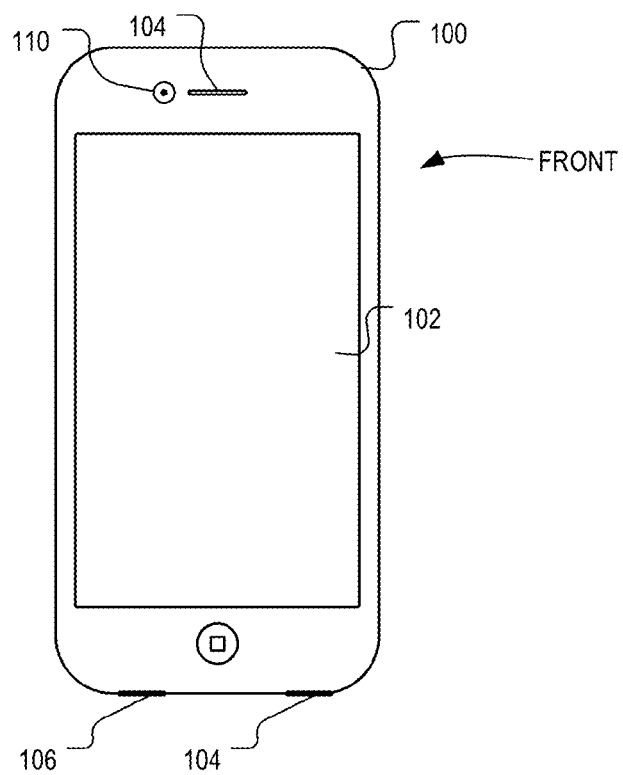
FIGS. 1A and 1B illustrate a front side and a backside, respectively, of a mobile platform.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure are directed to generating a model for spatio-temporal pattern recognition. That is, when detecting a temporal pattern within a continuously observed multi-dimensional variable, it is desirable to know where the variable deviates from the pattern under evaluation and how much it deviates. The temporal pattern may comprise an alphanumeric character, an object, speech, a gesture, stock market activity, meteorological patterns, and other temporal or spatio-temporal patterns. The variation amount may be considered before accepting or rejecting a temporal pattern. In other words, spatial diversity in temporal patterns may be significant enough to make an otherwise acceptable pattern rejected, or vice versa. Accordingly, aspects of the present disclosure provide for control over the amount of acceptable variation through the modeling process.

In accordance with aspects of the present disclosure, a nonparametric model may be used for detection of learned temporal manifolds with spatial diversity. In some aspects, the model may be based on a stochastic process such as a two-parameter Dirichlet process known as a Pitman-Yor process. For example, spatial diversity may be modeled by the Pitman-Yor process with a covariance regression process (e.g., a Gaussian process covariance regression) imposed on the second parameter. Hidden Markov models may be applied to model the temporal dynamics of the manifolds given the sequences of components of a mixture model. This allows evaluation of a given manifold and rejection of arbitrary sequences which is of significant importance in applications where patterns are to be discovered within continuous sequences of observation (e.g., temporal patterns within continuous hand movements).

Temporal manifolds are used in many applications including hand tracking, gesture recognition, and human action recognition. Conventional hidden Markov models (HMM) have been used in detecting temporal events in many applications including speech and gesture recognition. There have been different versions of HMM including the HMMs with discrete and continuous density emissions used in applications where observations occur with spatial diversity.

Spatial data play an important role for many applications, such as recognition of trajectories for flow detection and gesture recognition. Some conventional methods used for modelling spatial data include K-means and Gaussian mixture models (GMMs), in which data points are grouped together to define a set of clusters each representing a symbol in an alphabet. In a vocabulary of words (e.g., English words, spoken words, trajectories, or gestures), individual sequences of symbols from an alphabet may create meaningfully different words (manifolds, gestures, etc.)

One problem with detection of spatio-temporal patterns relates to the rejection of movements that are not similar to any member of a vocabulary of learned patterns. This is particularly important in speech and gesture recognition. For applications such as gesture and action recognition, a gesture/action is defined as a movement within a multidimensional space in which all parts of the movement should be completed in order to be considered as one of the learned models in the vocabulary. This means that, for example, if a trained pattern or movement appears as a circle in space, a curve that is partially similar to a circle (e.g., 60% of a circle) is not acceptable and is rejected. In detection of patterns within a continuous movement, this is particularly important because arbitrary movements happen frequently and many of them may be partially similar to some of the trained patterns.

Accordingly, aspects of the present disclosure provide a nonparametric model for localizing patterns and rejecting observations and movements of a trajectory that are not similar to any pattern in a vocabulary. The temporal dynamics of the patterns may be modeled with Hidden Markov Models and their spatial variations with a Dirichlet process mixture (DPM) model with Gaussian emissions. The mixture of Gaussians allows for an infinite set of observations suitable for spatially diverse patterns. The DPM may be used for clustering observations. Component labels of the mixture may in turn be used in the HMMs for modeling the temporal dynamics of each pattern.

Furthermore, configurations herein are used for detecting or rejecting a sequence. Therefore, a clear and strong separation gap between accept and reject regions is desirable. For example, it is desirable for the data from the acceptable region to produce a large likelihood that is significantly larger than the likelihood produced by the data from reject regions. For instance, if the likelihood for accept is −100 and larger and the likelihood for reject is −300 and smaller, then there is enough separation to avoid confusion. However, if the likelihood for accept is −100 and larger, and the likelihood for reject is −115 and smaller, the gap is small such that some acceptable inputs may cause the likelihood to be a little smaller than −115 and therefore be rejected.

Because a clear and strong separation gap is desirable, the model may be configured without the use of a continuous density emissions HMM (CDHMM). In a CDHMM, probabilities of emissions are presented by a mixture of probability density functions such as Gaussians and a vector of mixture coefficients. Therefore, an observation far from the center of a density will produce a small likelihood, which causes penalties in the HMMs likelihood. The CDHMM makes a smooth movement from the accept to the reject region causing the separation between the accept region and the reject region to be vague and unclear. Conversely, in accordance with aspects of the present disclosure, the gap between the accept region and the reject region may be enlarged by considering the observations from the complementary cluster that cause the HMMs to produce very small likelihoods. The sequences that do not have data points from the complementary cluster have larger likelihoods.

Figure 1B:
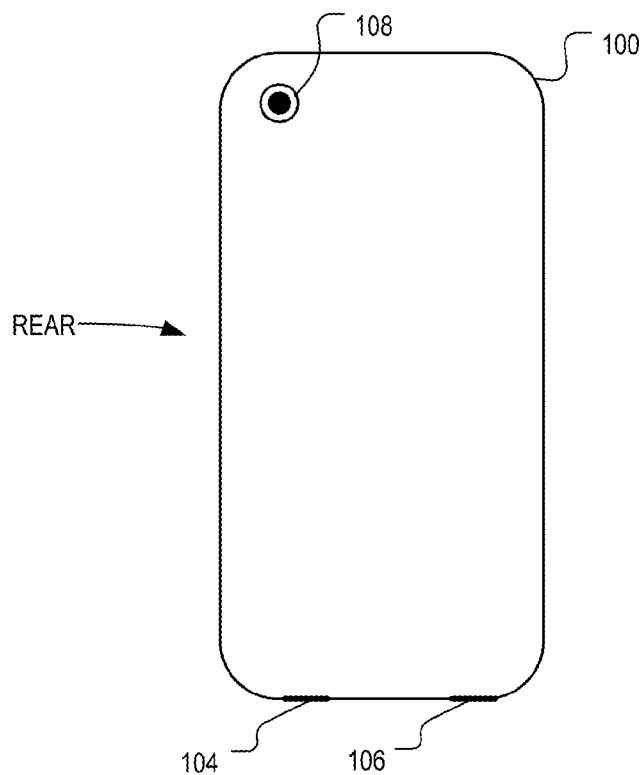

FIGS. 1A and 1B illustrate a front side and a back side, respectively, of a mobile platform 100 that is configured to receive user input via a front-facing camera 110. The mobile platform 100 is illustrated as including a front-facing display 102, speakers 104, and a microphone 106. The mobile platform 100 further includes a rear-facing camera 108 and front-facing camera 110 for capturing images of an environment. The mobile platform 100 may further include a sensor system that includes sensors such as a proximity sensor, an accelerometer, a gyroscope, proximity sensor, a touch sensor/screen or the like, which may be used to assist in determining the position and/or relative motion of the mobile platform 100 or the position of a touching finger on the screen.

As used herein, a mobile platform refers to any portable electronic device such as a cellular or other wireless communication device, personal communication system (PCS) device, personal navigation device (PND), personal information manager (PIM), personal digital assistant (PDA), or other suitable mobile device. The mobile platform may be configured to receive wireless communication and/or navigation signals, such as navigation positioning signals. The mobile platform may comprise devices which communicate with a personal navigation device (PND), such as by short-range wireless, infrared, wireline connection, or other connection, regardless of whether satellite signal reception, assistance data reception, and/or position-related processing occurs at the device or at the PND. In some aspects, the mobile platform may also comprise electronic devices, including wireless communication devices, computers, laptops, tablet computers, head-mounted devices, wearable computers, and the like, which are capable of optically or by touch tracking a user-guided object via a front-facing camera or a touch sensor for recognizing user input.

Figure 2:
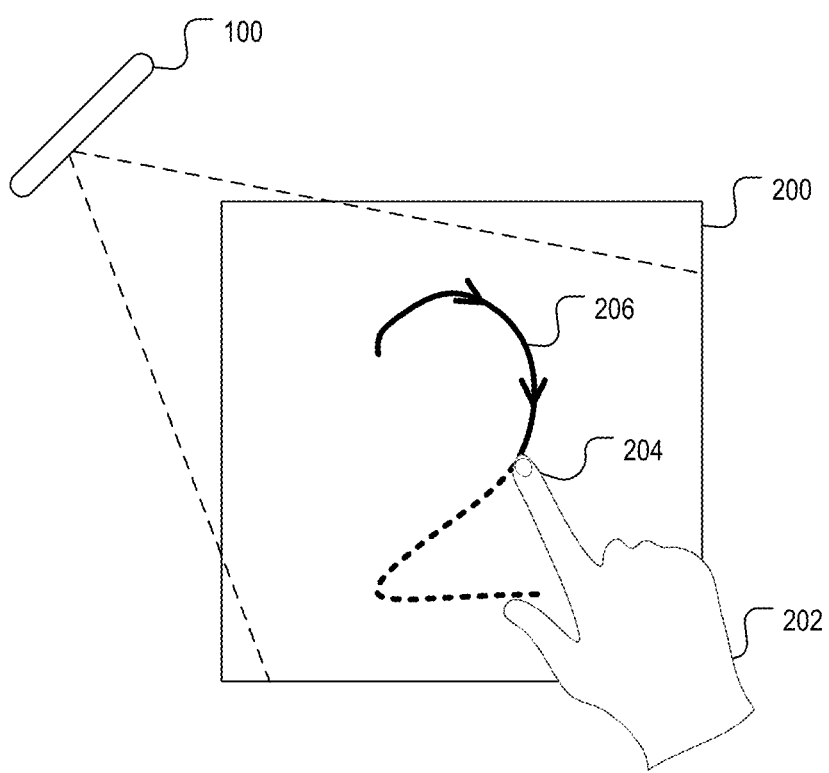
FIG. 2 illustrates a mobile platform receiving alphanumeric user input.

FIG. 2 illustrates a top view of an exemplary mobile platform 100 receiving alphanumeric user input via a camera (e.g., see front-facing camera 110 of FIG. 1A). The mobile platform 100 captures a sequence of images with its camera of a user-guided object. In this configuration, the user-guided object is a fingertip 204 of a user 202. However, in other aspects the user-guided object may include a writing implement such as a user's entire finger, a stylus, a pen, a pencil, a brush, or other writing implements.

The mobile platform 100 captures the series or sequence of images and in response thereto, tracks the user-guided object (e.g., fingertip 204) as the user 202 moves the fingertip 204 about the surface 200. In one configuration, the surface 200 is a planar surface and is separate and external to the mobile platform 100. For example, the surface 200 may be a table top or desk top. In another configuration, the user 202 may simply move the fingertip 204 in view of the mobile platform 100 but without contacting the surface (e.g., open space) for tracking by the mobile platform 100. In this configuration, a sequence of inputs may, for instance, track movement of the user fingertip 204 about a surface of the display 102. In yet another configuration, the surface 200 may be a touch screen, such as a touch sensitive display 102, in which an input is indicated based on a contacts with a surface of the display. In this configuration, a sequence of inputs may, for example, track contacts of the user fingertip 204 along and/or with a surface of the display 102.

The tracking data of the user-guided object by the mobile platform 100 may be analyzed by the mobile platform 100 in order to generate trajectory data. In one example, trajectory data is a set of temporally-ordered and spatially diverse data points. The mobile platform 100 may analyze all or a portion of the trajectory data in order to recognize various types of user input. For example, the trajectory data may indicate user input such as alphanumeric characters (e.g., letters, numbers, and symbols), gestures, and/or mouse/touch control input. In the example of FIG. 2, the user 202 is shown completing one or more strokes of an alphanumeric character 206 (e.g., number "2") by guiding the fingertip 204 across the surface 200. By capturing a series of images or recording movement across the touch display 102, as the user 202 draws the virtual number "2", the mobile platform 100 can track the fingertip 204 and then analyze the trajectory data to recognize the character input.

Figure 3:
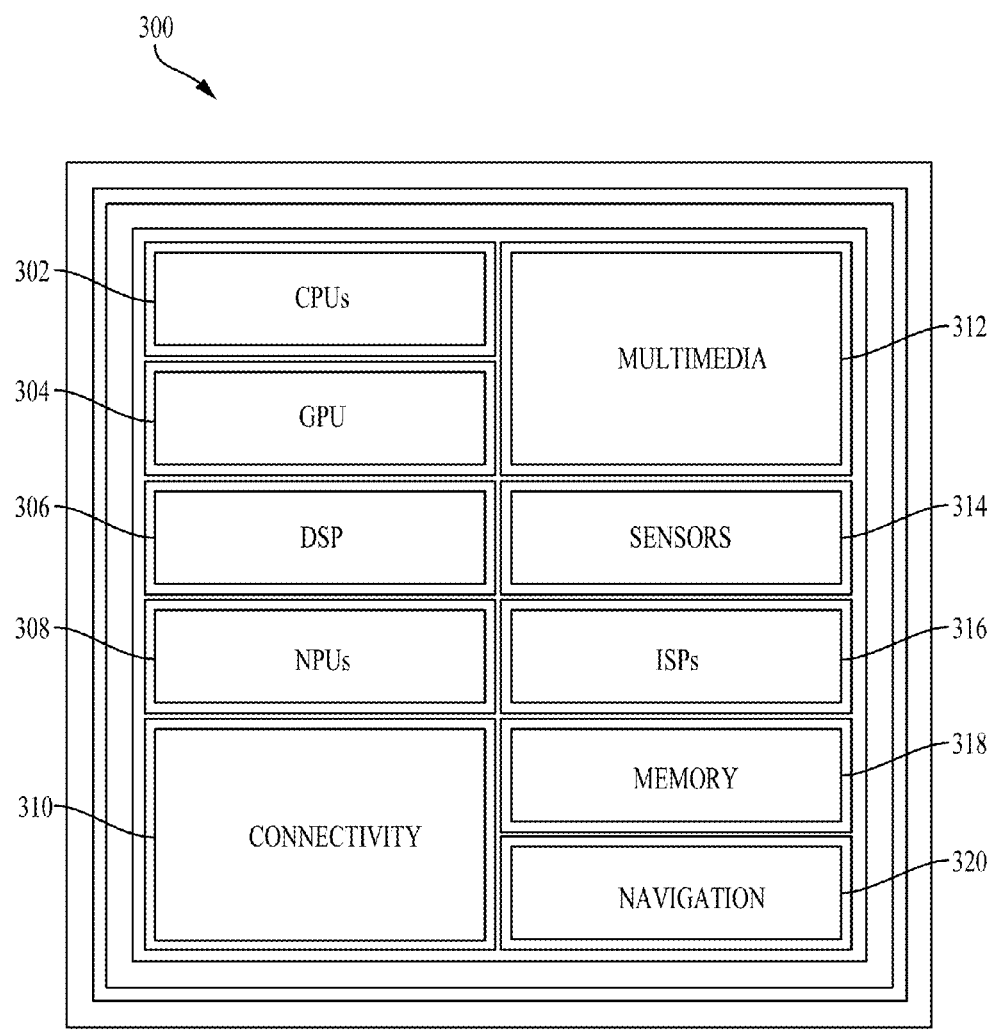
FIG. 3 illustrates an example implementation of designing a neural network using a system-on-a-chip (SOC), including a general-purpose processor in accordance with certain aspects of the present disclosure.

FIG. 3 illustrates an example implementation of the aforementioned generating a spatio-temporal pattern model for spatio-temporal pattern recognition using a system-on-a-chip (SOC) 300, which may include a general-purpose processor (CPU) or multi-core general-purpose processors (CPUs) 302 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 104, in a memory block associated with a digital signal processor (DSP) 306, in a dedicated memory block 318, or may be distributed across multiple blocks. Instructions executed at the general-purpose processor 302 may be loaded from a program memory associated with the CPU 302 or may be loaded from a dedicated memory block 318.

The SOC 300 may also include additional processing blocks tailored to specific functions, such as a GPU 304, a DSP 306, a connectivity block 310, which may include fourth generation long term evolution (4G LTE) connectivity, unlicensed Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs), and/or navigation 320, which may include a global positioning system.

The SOC 300 may be based on an ARM instruction set. In an aspect of the present disclosure, the instructions loaded into the general-purpose processor 302 may comprise code for receiving training trajectories. Each of the training trajectories includes diverse data points representative of a spatio-temporal pattern and the received training trajectories define an area. The instructions loaded into the general-purpose processor 302 may also comprise code for partitioning the area into observed clusters and a non-observed complementary cluster. Further, the instructions loaded into the general-purpose processor 302 may comprise code for generating the spatio-temporal pattern model to include the observed clusters and the non-observed complementary cluster.

Figure 4:
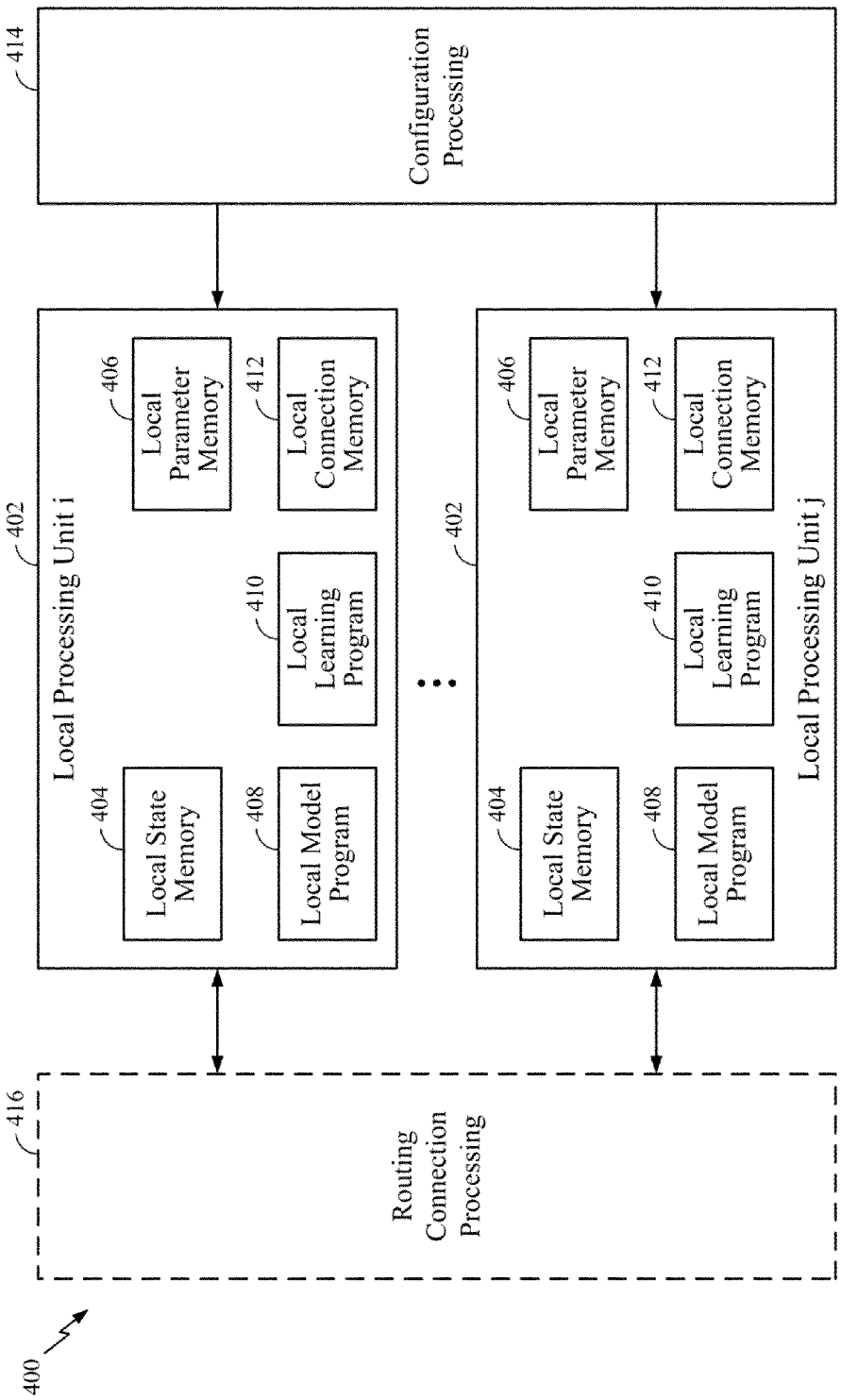
FIG. 4 illustrates an example implementation of a system in accordance with aspects of the present disclosure.

FIG. 4 illustrates an example implementation of a system 400 in accordance with certain aspects of the present disclosure. As illustrated in FIG. 4, the system 400 may have multiple local processing units 402 that may perform various operations of methods described herein. Each local processing unit 402 may comprise a local state memory 404 and a local parameter memory 406 that may store parameters of a machine learning model. In addition, the local processing unit 402 may have a local (e.g., neuron) model program (LMP) memory 408 for storing a local model program, a local learning program (LLP) memory 410 for storing a local learning program, and a local connection memory 412. Furthermore, as illustrated in FIG. 4, each local processing unit 402 may interface with a configuration processor unit 414 for providing configurations for local memories of the local processing unit, and with a routing connection processing unit 416 that provides routing between the local processing units 402.

Figure 5:
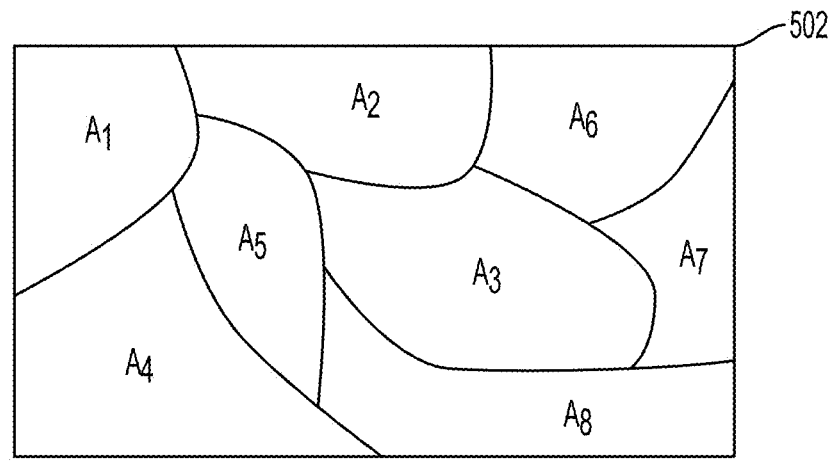
FIG. 5 is a diagram illustrating a partitioned spatial area according to a Dirichlet process in accordance with aspects of the present disclosure.

FIG. 5 is a diagram illustrating a partitioned spatial area 502 according to a Dirichlet process. As shown in FIG. 5, the spatial area 502 has been partitioned into eight regions A1-A8.

In accordance with aspects of the present disclosure, undesirable observations and sequences may be rejected. In some aspects, a Dirichlet process mixture model may be imposed on an infinite space of observations to define accept regions and reject regions. The Dirichlet process may be used to define partitions of the space of observations by $\theta$ and $\alpha$ to be a positive real number so that for any finite measurable partition $A_1, A_2, \ldots, A_K$ on $\theta$, $A_1 \cup A_2 \cup \ldots \cup A_K = \theta$, and G is a random probability measure over $\theta$, $(G(A_1), G(A_2), \ldots, G(A_K)) \sim \text{Dirichlet}(\alpha H(A_1), \alpha H(A_2), \ldots, \alpha H(A_K))$. According to this definition, the space of observations (e.g., spatial area) may be partitioned into a number or regions as shown, for example, in FIG. 5. If G is distributed according to a Dirichlet process (DP) (e.g., $G \sim DP(\alpha, H)$, a draw from G is $\theta_i$ where $\theta_i | G \sim G$ for $i=1, 2, \ldots, N$ and the posterior of the Dirichlet process is given by:

$$G | \theta_1, \theta_2, \ldots, \theta_N, \alpha, H \sim DP\left(\alpha + N, \frac{\alpha}{\alpha+N}H + \frac{1}{\alpha+N}\sum_{k=1}^{K}\delta_{\theta_k}\right) \quad (1)$$

By marginalizing G, the prediction distribution is given by:

$$p(\theta_{i+1} = \theta | \theta_1, \theta_2, \ldots, \theta_i, \alpha, H) = \frac{\alpha}{\alpha+N}h(\theta) + \frac{1}{\alpha+N}\sum_{k=1}^{K}N_k\delta(\theta, \theta_k) \quad (2)$$

where $|\Theta|$ is the current number of partitions, $N_k$ is the number of observations at partition k, N is the total number of observations, $\delta(\theta, \theta_k)$ is a delta function (e.g., Kronecker delta function), and $\alpha$ is a parameter of the symmetric Dirichlet distribution.

According to Equation 2, a new observation will be assigned to any currently populated (non-empty) partitions or clusters k with probability $$\frac{N_k}{\alpha+N}.$$

Alternatively, a new observation may be assigned to a new unpopulated (empty) partition with probability $$\frac{\alpha}{\alpha+N}.$$

Thus, if $\alpha$ is small compared to the number of observation at the current partitions, it will be more likely that a new observation is assigned to one of the current partitions (and not a new partition).

Applying a stochastic process (e.g., Pitman-Y or process), the prediction probability distribution may be given by:

$$p(\theta_{i+1} = \theta | \theta_1, \theta_2, \ldots, \theta_i, \alpha, H, d) = \quad (3)$$

$$\frac{\alpha + |\theta|d}{\alpha + N} h(\theta) + \frac{1}{\alpha + N} \sum_{k=1}^{K} (N_k - d)\delta(\theta, \theta_k)$$

where d is a parameter for controlling the area of the regions or clusters.

In Equation 3, the parameter d may, for example, be defined such that $0 \leq d < 1$ and $\alpha > -d$. In this example, the parameter d may control the number of regions or clusters with one or very few observations (trajectories). That is, the larger the value of d, the more regions or clusters with smaller number of observations (trajectories). In addition, the larger the d, the fewer the number of regions or clusters with large number of observations, and the larger the number of observations (trajectories) within each region.

In one exemplary aspect, spatially distributed data points may be modeled by Gaussian clusters. A stochastic process such as the Pitman-Y or process may be used to limit the range of the Gaussian clusters. A group of training data points for a word in a vocabulary may be clustered with a Gaussian mixture model. The Pitman-Y or process (PYP) may be used to cluster the space into a finite number of clusters or regions. As such, the space of observation may be partitioned into a limited number of regions or clusters with some clusters having training data points assigned thereto with the potential or capability to grow more clusters. Considering an infinite set of clusters with no assigned data points as a single cluster collectively, the Pitman Y or process may be used to cluster the space into the following set:

$$p(\theta_{i+1} = \theta | \bar{\theta}_1, \bar{\theta}_2, \ldots, \bar{\theta}_i, \alpha, H, d) = \quad (4)$$

$$\frac{\alpha + |\bar{\Theta}|d}{\alpha + N} h(\theta) + \frac{1}{\alpha + N} \sum_{k=1}^{K} (N_k - d)\delta(\theta, \bar{\theta}_k)$$

where $\bar{\theta}_k$s are the trained Gaussian partitions (e.g., regions or clusters).

Figure 6:
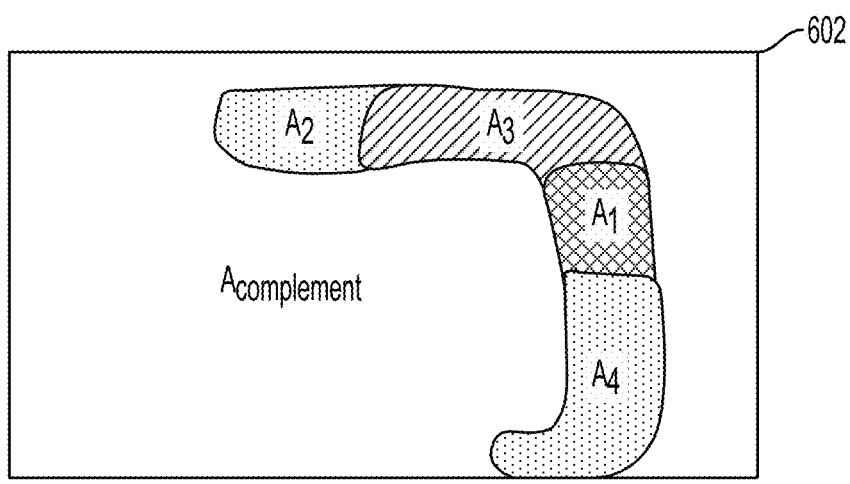
FIG. 6 is a diagram illustrating a partitioned spatial area according to a Pitman-Yor process in accordance with aspects of the present disclosure.

FIG. 6 is a diagram illustrating a partitioned spatial area 602 according to a stochastic process such as the Pitman-Y or process. Referring to FIG. 6, the spatial area 602 has been partitioned into four observed regions $A_1$, $A_2$, $A_3$, and $A_4$ and one non-observed complementary region $A_{complement}$. Although four observed regions are shown in FIG. 6, this is merely for ease of explanation and the present disclosure is not so limited. As indicated herein, any number of regions may be used to partition the space of observation. In one configuration, the complementary region $A_{complement}$ collectively represents all unobserved partitions that can be initiated by the PYP of Equation 4.

The PYP of Equation 4 may be used to limit the range of each Gaussian cluster and evaluate creation of a new cluster when the data point i+1 is considerably unlikely to be generated by one of the trained components. The position of a new cluster initiated by the Pitman-Y or process can therefore be anywhere. In some aspects, the base distribution for the PYP of Equation 4 may be of a Gaussian family because the mixture model is Gaussian.

The mean and covariance of the Gaussians in the mixture model may both be unknown and sampled from conjugate priors. Because the covariance matrix is positive definite (transpose is positive for every non-zero column vector), its conjugate prior for the case that mean is fixed has an inverse-Wishart distribution $\Lambda \sim IW(v, \Delta)$, which is a multi-dimensional analog of the inverse-Gamma-Normal conjugate prior for single-dimension Gaussian sampling. In some aspect, the multidimensional mean and the covariance matrix are uncertain. Therefore, a proper prior for this case is a Normal-inverse-Wishart distribution with density expressed as:

$$\Lambda \sim W(v, \Delta) \text{ and } \mu \sim N\left(v, \frac{\Lambda}{k}\right) \quad (5)$$

$$p(\mu, \Lambda | k, u, v, \Delta) \propto |\Lambda|^{-\left(\frac{v+d}{2}+1\right)} e^{-\frac{1}{2} tr\left(v\Delta\Lambda^{-1} - \frac{k}{2}(\mu-v)^T \Lambda^{-1}(\mu-v)\right)}$$

where v denotes the degree of freedom and is generally chosen to be larger than the number of dimensions of the data, $\Delta$ is the pseudo covariance matrix with v as the size of its data set, and k is the size of the pseudo data set for the prior with the expected mean of v. The predictive likelihood of an observation x* may be distributed according to a Student-t distribution with $(\bar{v}-d+1)$ degree of freedom. Thus, the predictive likelihood may then be approximately given by a normal distribution with mean $\bar{v}$ and covariance $$\frac{(\bar{k}+1)\bar{v}}{k(\bar{v}-d-1)} \bar{\Delta}.$$

Accordingly, using the Pitman-Y or process and having determined proper distributions for the conjugate prior for the base normal distribution, the distribution may be sampled for inference. In one exemplary aspect, a Gibbs sampler process may be used for training and for inference from the PYP. The PYP likelihood models the emissions of hidden Markov models where the partition labels of each cluster is considered as the observations. The PYP likelihood for observing data points not belonging to any of the partitions with assigned data points allows for extending the observation into an infinite set of partitions without any observation, which may be referred to as a complement partition or region (e.g., $A_{complement}$). Therefore, the observations unlikely from the occupied partitions may be given the label of the complement partition. The HMM is thus modified to accommodate these observations. Because there has been no instance of such observations in the clustering process and training of the HMMs in a vocabulary, the complement partition (e.g., $A_{complement}$) is added to each HMM's table of observations with a very small probability collectively subtracted from other observations (this makes sure that the emission matrix remains stochastic). For example, if $B_w$ is the matrix of emissions for the HMM of word w, the probability of an observation from the complement partition is then given by:

$$\hat{b}_{s,w}(o_k) = b_{s,w}(o_k) - \epsilon; k=1, \ldots, K_w; 0 < \epsilon \ll 1 \; \hat{b}_{s,w}(o_{K_w+1}) = |K_w| \cdot \epsilon \quad (6)$$

where $\hat{b}_{s,w}(o_k)$ is the adjusted emission probability of observation $O_k$ at state s for the word w. $O_{k_w}+1$ represents all of the observations from the complement partition, and $|K_w|$ denotes the number of occupied partitions in the mixture model for the word w. Although inter-word partition overlap is possible, the PYP of each word is inferred separately for a sequence of observations and therefore, the partitions of each word's PYP are the highest value representation of the observations for that word according to the training data. Therefore, the spatial variations of the data points at each partition are represented by the associated training data of that word.

In some aspects, the Dirichlet process may attract new members to already occupied or populated clusters or regions with probability $$\frac{N_k}{\alpha + N}.$$

Therefore, when inferring regarding a new observation, it may be that the likelihood that a new partition is initiated and occupied with this observation may be very low. In other words, the Dirichlet process may tend to produce many large partitions. However, it is desirable to exclude a data point from the set of occupied partitions if it is more likely to be from the complement partition. Further, because the data may differ at various areas, it may be unreasonable to limit all the components of the mixture with the same limiting factor. Therefore, instead of limiting the mixture components equally, in some aspects, the second parameter of the Pitman-Y or process (e.g., parameter d) may be set according to data and allow the components covariance to control the range of each component.

Due to the spatial nature of the data points, a spatial model may be used to provide the second parameter of the PYP (e.g., parameter d). For this, a model for which the spatial variation of the data is modeled by nonparametric covariance regression may be employed. Considering the conditional distribution of a multidimensional Gaussian variable given a set of Gaussian variables with the same dimensionality, if $x^*$ is a d-dimensional variable and X represents a set of Gaussian variables, the mean and covariance of the conditional distribution $p(x^*|X)$ is given by:

$$\mu_{x^*|X} = \mu_{x^*} + \Sigma_{x^*X}\Sigma_{XX}^{-1}(x^* - \mu_X) \quad (7)$$

$$\Sigma_{x^*|X} = \Sigma_{x^*x^*} - \Sigma_{x^*X}^T \Sigma_{XX}^{-1}\Sigma_{x^*X} \quad (8)$$

To avoid the computational burden of a high-dimensional data regression, in some aspects, the mean and covariance of the data may be modelled by functions sampled from some prior distributions. Thus, a Gaussian model may be created for the data in a potentially infinite-dimensional Gaussian space (e.g., $\mu(x_1), \ldots, \mu(x_n) \sim N((m(x_1), \ldots, m(x_n), K(x_1, \ldots, x_n)))$, which is a Gaussian process (GP). Considering data to be stationary is reasonable because the patterns are independent of a location of observations. Therefore, a stationary covariance function such as the squared exponential may be used:

$$k(x, x^*) = \tau^2 e^{-\frac{|x-x^*|^2}{l^2}} \quad (9)$$

where $\tau$ is the magnitude and l is the smoothness of the covariance function. In some aspects, only the covariance of the conditional distribution for a given data point may be considered:

$$cov(x^*|X) = K(x^*,x^*) - K(x^*,X)^T(K(X,X)+\sigma^2 I)^{-1}K(x^*,X) \quad (10)$$

In some configurations, there may not be any outputs associated with the data points considering the data to represent a Gaussian process. Therefore, in this case, the expectation of the GP for the data point $x^*$ has no meaning. However, the covariance regression may be dominated by the desire to invert the term $(K(X,X)+\sigma^2 I)$. But, it can be computed rationally fast because the term is independent of the observation $x^*$ and can be stored. As such, the process of covariance regression may also be fast.

In some aspects, the hyper parameters ($\tau$ and l) of the covariance function of Equation 9 may be set such that the regression is useful for the Pitman-Y or process. Because there is no output for the data points, the marginal likelihood of the outputs cannot be maximized given the data X and the hyper parameters of the Gaussian process. Therefore, in some aspects, heuristics may also be used.

For example, to abide with the constraint $0 \le d < 1$ for parameter d in Equation 3, the magnitude $\tau$ of the covariance function may be set to a value smaller than but close to 1 (e.g., $\tau=0.99$). This may in fact not be enough to make sure the regressed covariance is smaller than 1 everywhere. Alternatively, in some aspects, the magnitude $\tau$ may be set to a smaller value. The regressed values may also be scaled down equally for all the data points.

On the other hand, the smoothness parameter l (also referred to herein as the length-scale) may be set to an appropriate value representing how smoothly the data changes.

The covariance regression function in Equation 10 can be interpreted as a conditional likelihood of a mixture of basis functions each centered at a data point from the given data set X. The variance of each basis function may then be controlled by the length-scale parameter l. In order to set l appropriately, such that the mixture of the basis functions do not over-fit or under-fit the data, in some aspects, the length-scale parameter l may be set to be equal to the average minimum distance between the observations multiplied by a coefficient as given, for example, by:

$$l = \eta \bar{\Delta}, \bar{\Delta} = \text{mean}(\Delta_1, \ldots, \Delta_N), \text{ for all } \Delta_n = \min(|x_i - x_j|^2), \forall i \ne j \quad (11)$$

where the coefficient $\eta$ may be used to adjust (e.g., expand or reduce) the area of the clusters.

The regression process produces values between 0 and 1 (not including 1). For the points close to or in the given data set X, the regressed covariance is very small and for the points away from the items in the data set, it will be large.

Figure 7A:
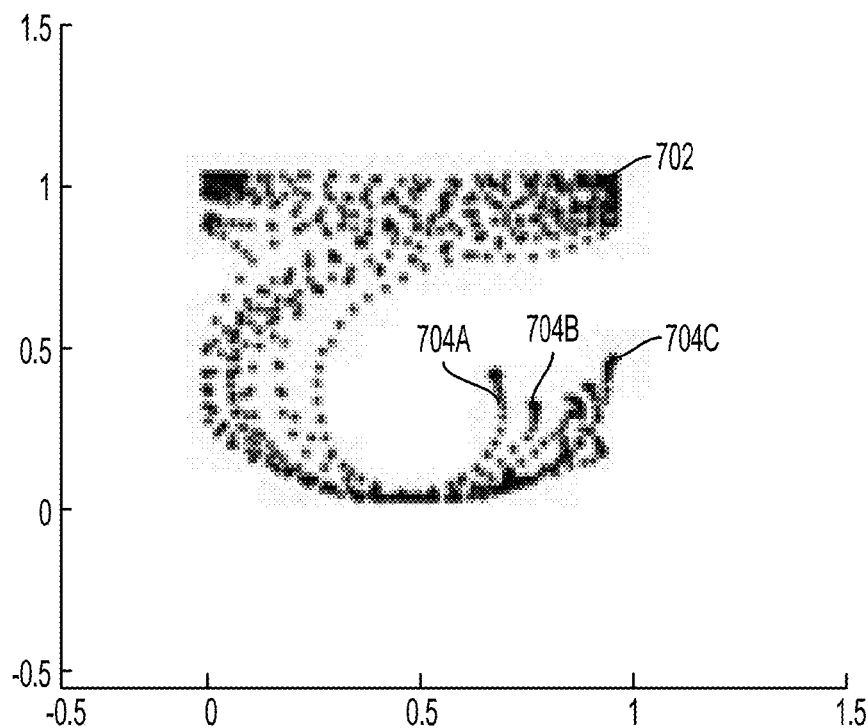
FIG. 7A is a diagram illustrating a set of training trajectories for the alphanumeric character "2," presented upside down.
Figure 7B:
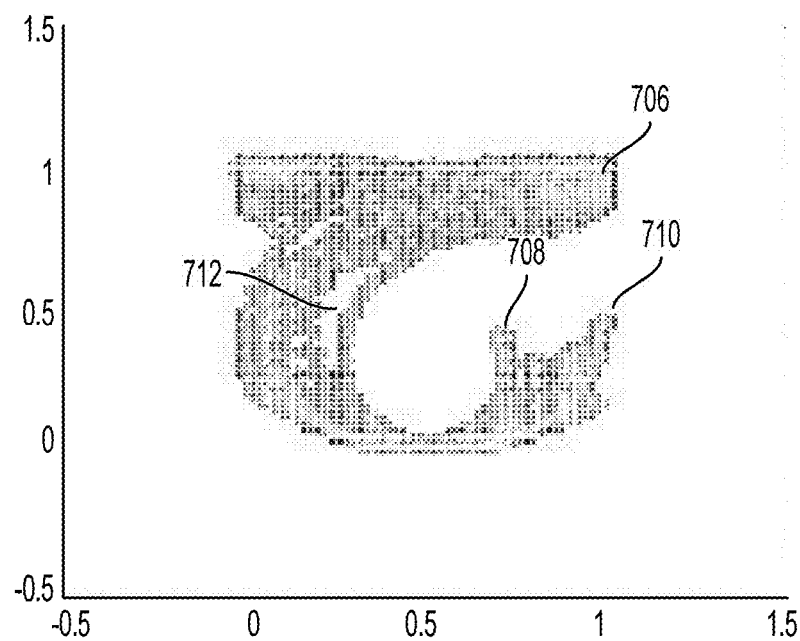
FIG. 7B is a diagram illustrating a Gaussian process covariance of the training trajectories of FIG. 7A.
Figure 7C:
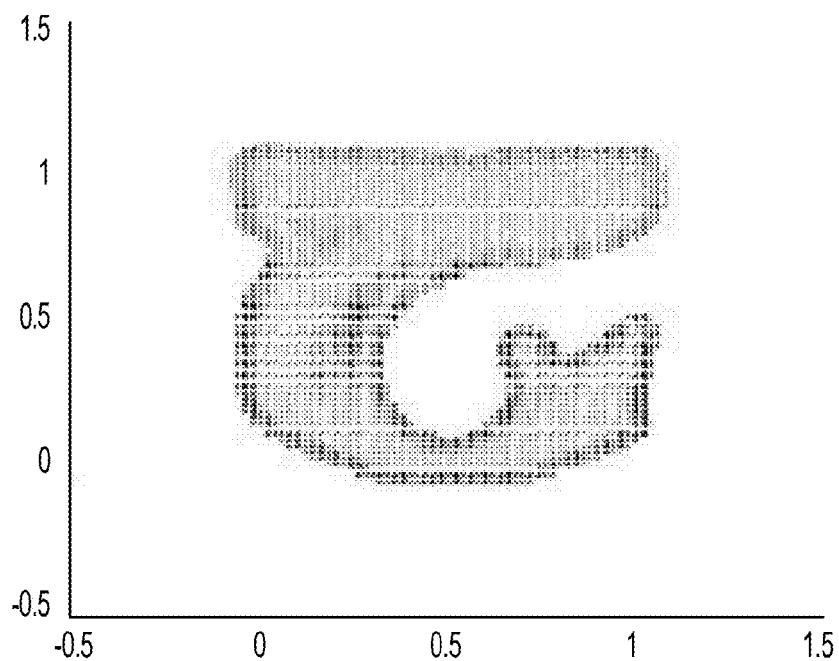
FIG. 7C is a diagram illustrating another Gaussian process covariance of the training trajectories of FIG. 7A, with an increased length-scale as compared to that used for FIG. 7B.
Figure 7D:
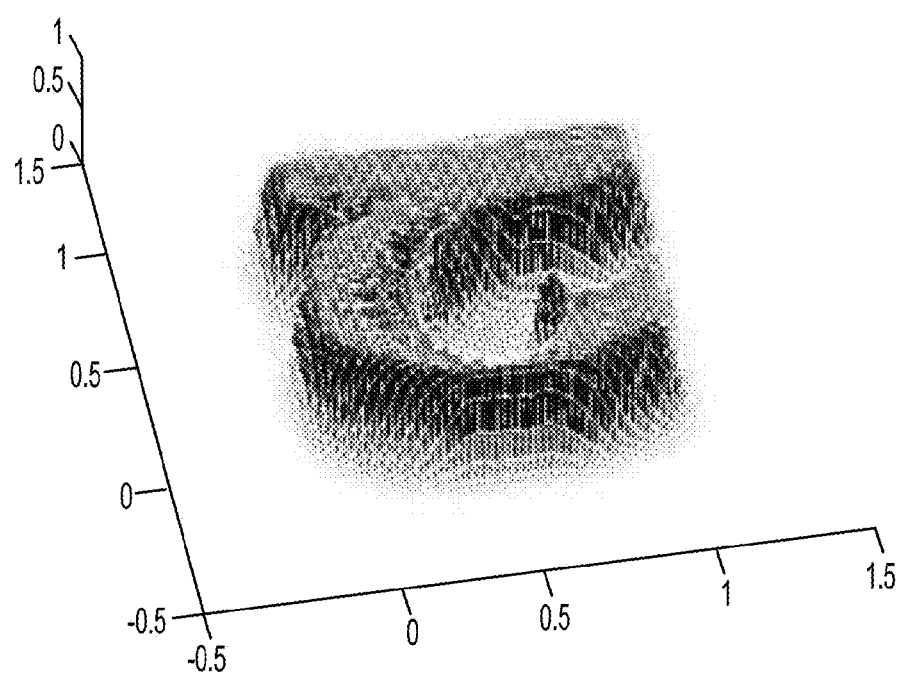
FIG. 7D is a three-dimensional (3D) representation of the Gaussian process covariance of FIG. 7C.

FIGS. 7A-7D illustrate examples of covariance regression for a trajectory with different values for $\eta$. FIG. 7A is a diagram illustrating a set 702 of training trajectories (e.g., 704A-C) for the alphanumeric character "2," presented upside down. The training trajectories may be normalized to provide a training pattern that may be used for recognition. FIG. 7B is a plot illustrating a Gaussian process covariance of the training trajectories of FIG. 7A. FIG. 7C is a diagram illustrating another Gaussian process covariance of the training trajectories of FIG. 7A, with an increased length-scale (e.g., l=0.0488) as compared to that used for FIG. 7B (e.g., l=0.0244). FIG. 7D is a three-dimensional (3D) representation of the Gaussian process covariance of FIG. 7C.

From FIGS. 7B and 7C showing the result for the value of $1-cov(x^*|X)$ for the given set X, it may be determined that the larger the $\eta$ coefficient, the larger the l (because $\bar{\Delta}$ is positive) and the smoother the mixture blanket on the set X In fact the edges of the mixture blanket are also controlled by the hyper parameter l. Referring to FIG. 7B, at the beginning of trajectories of digit "2," the model has two disjoint branches 708 and 710 with a gap in between. Additionally, in FIG. 7B an empty area 712 between separate samples is shown. However, the Dirichlet process with the Gaussian base distribution may be used to anticipate and account for future variations. In some aspects, the second parameter (parameter d) may be set to the GP covariance of the samples multiplied by an adjustable coefficient. This may provide an excellent hint for the PYP to include and foresee variations while the range of each distribution is controlled. As indicated above, a small parameter d, in Equation 3 may result in a higher probability that a given data point is assigned to an already occupied component (e.g., region or cluster). Inversely, a higher d may cause the process to allow for a new component to be generated if the data point is unlikely enough to be generated by one of the occupied components. Therefore, the GP covariance at a given point x* may, in some aspects, be used as d for the Pitman-Yor process. As such, the process may assign a new component sampled from the base distribution $h(\theta)$ if x* is far enough away from the occupied components.

Figure 8A:
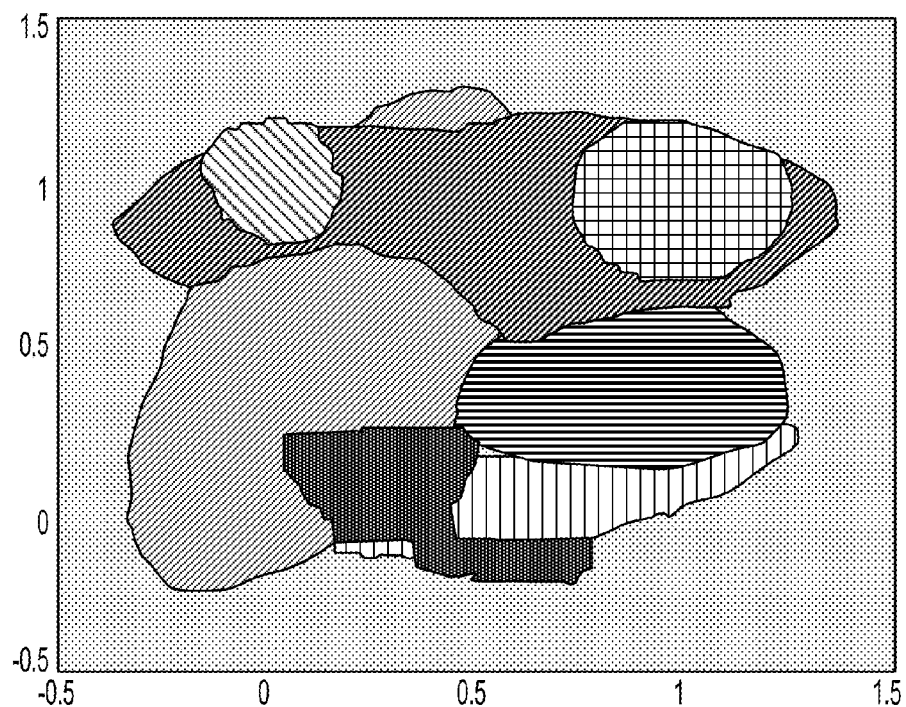
FIGS. 8A-C are diagrams illustrating a partitioned spatial area according to a Pitman-Yor process applied to the training trajectories of FIG. 7A in accordance with aspects of the present disclosure.
Figure 8B:
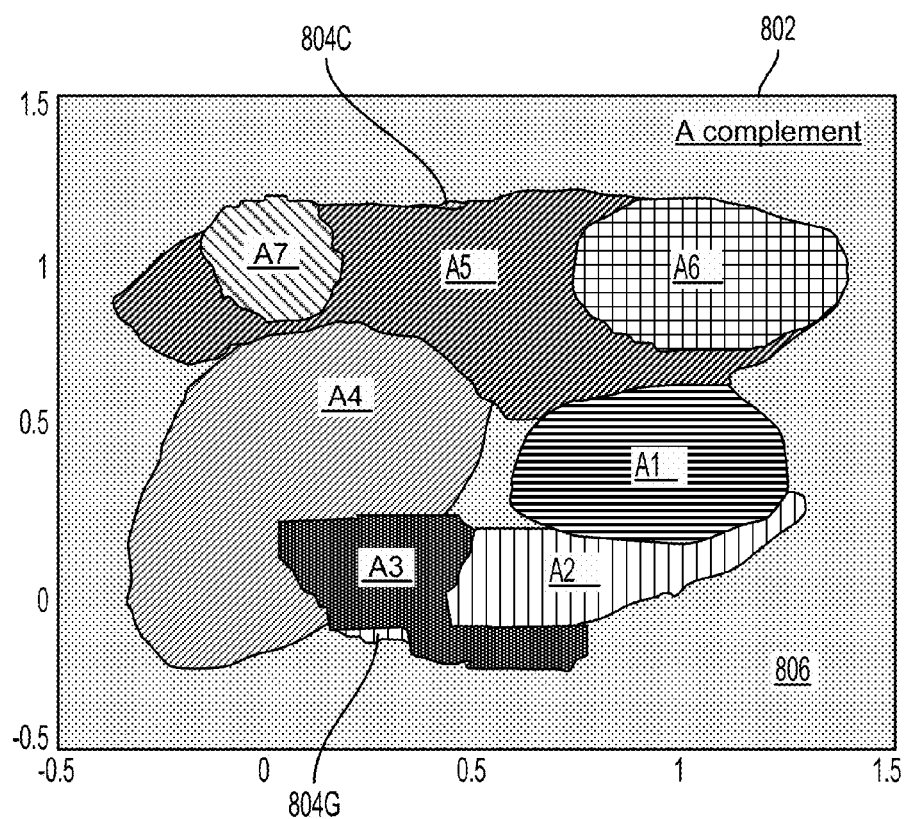
Figure 8C:
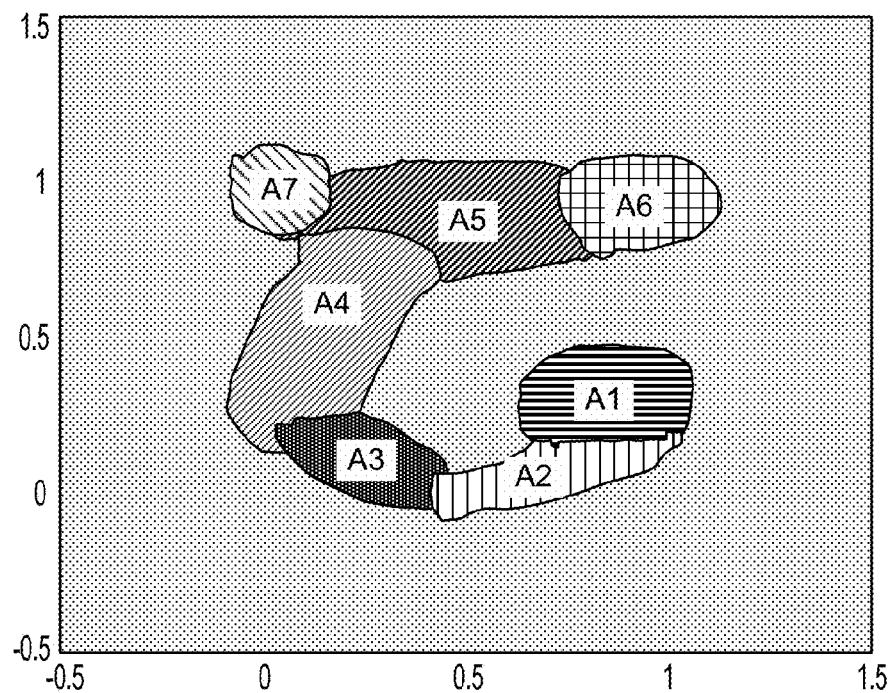

FIGS. 8A-8C show examples of the Pitman-Yor process applied to the trained model based on the trajectories of FIG. 7A. FIG. 8A is a diagram illustrating a partitioned spatial area according to a Pitman-Y or process applied to the trained model based on the trajectories of FIG. 7A with the parameter d set to zero. Referring to FIG. 8B, a Dirichlet process is applied to produce clustered space based on a set of training trajectories of FIG. 7A. Clusters A1-A7 are shown along with $A_{complement}$. FIG. 8C is a diagram illustrating a partitioned spatial area according to a Pitman-Yor process applied to the trained model based on the trajectories of FIG. 7A with the parameter d set based on a Gaussian process covariance (e.g., GP covariance with length-scale l=0.0244). As shown in FIG. 8B, the areas for regions A1-A7 are relaxed such that the pattern is still detectable but may result in false positives. FIG. 8C is a diagram illustrating a partitioned spatial area according to a Pitman-Yor process applied to the trained model based on the training trajectories of FIG. 7A with the parameter d multiplied with a coefficient greater than one (d>1.0). As shown in FIG. 8A the areas defining the clusters of the pattern are very relaxed such that the digit 2 is no longer discernable.

Figure 9:
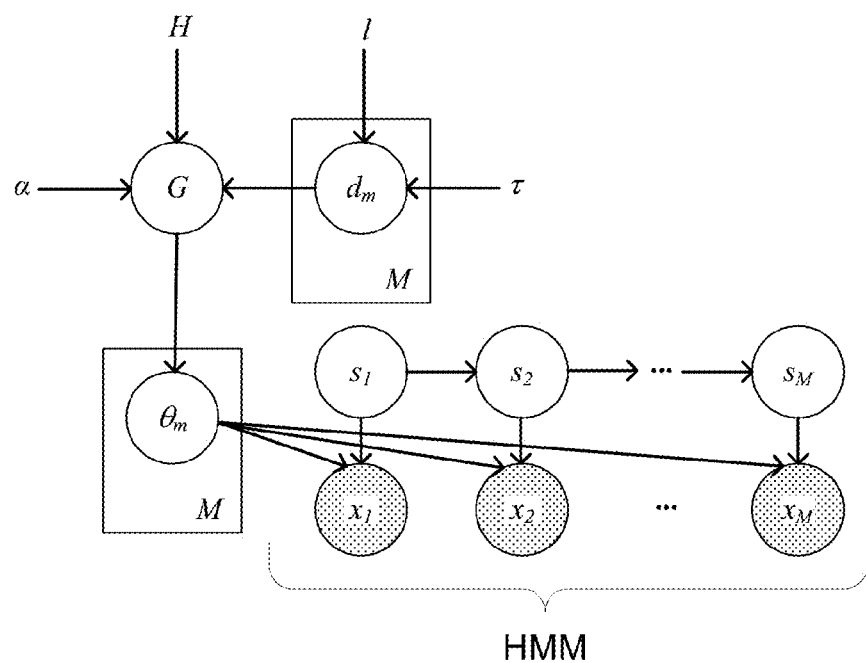
FIG. 9 is a graphical illustration of a method for recognition of spatio-temporal pattern.

FIG. 9 is a graphical representation of a model of spatio-temporal pattern recognition. In the model of FIG. 9, a Dirichlet Process mixture model (DPM) is shown with parameters α, d, and a base distribution H. The hidden Markov model receives the sequence of observations from the DPM which is the sequence of component labels extracted by the DPM.

In some aspects, the correctness of the recognized pattern may be verified. Verifying the correctness of a recognized pattern in a given sequence of data points includes verifying that all the areas of the pattern are met properly. To be verified most of the partitions in the trained model are met throughout the given trajectory. That is, a pattern is met if it has data points along the trajectory assigned by the PYP to the clusters of a given pattern. In some aspects, the HMM may further identify that the sequence of trajectories meeting the partitions is in the correct order.

Because PYP assigns the data points of a given sequence to the clusters, the number of data points assigned to each cluster may be clear. Furthermore, it is known exactly how many data points are given new clusters by PYP meaning they belong to the complement partition collectively representing the areas not covered by the trained clusters. Using a counting scheme for making sure that each partition receives a certain minimum number of allocated data points and the complement partition's allocated points are below a tolerable minimum, the number of partitions meeting these criteria is considered as a measure to whether the given sequence properly meet all areas of the trained model properly.

Figure 10:
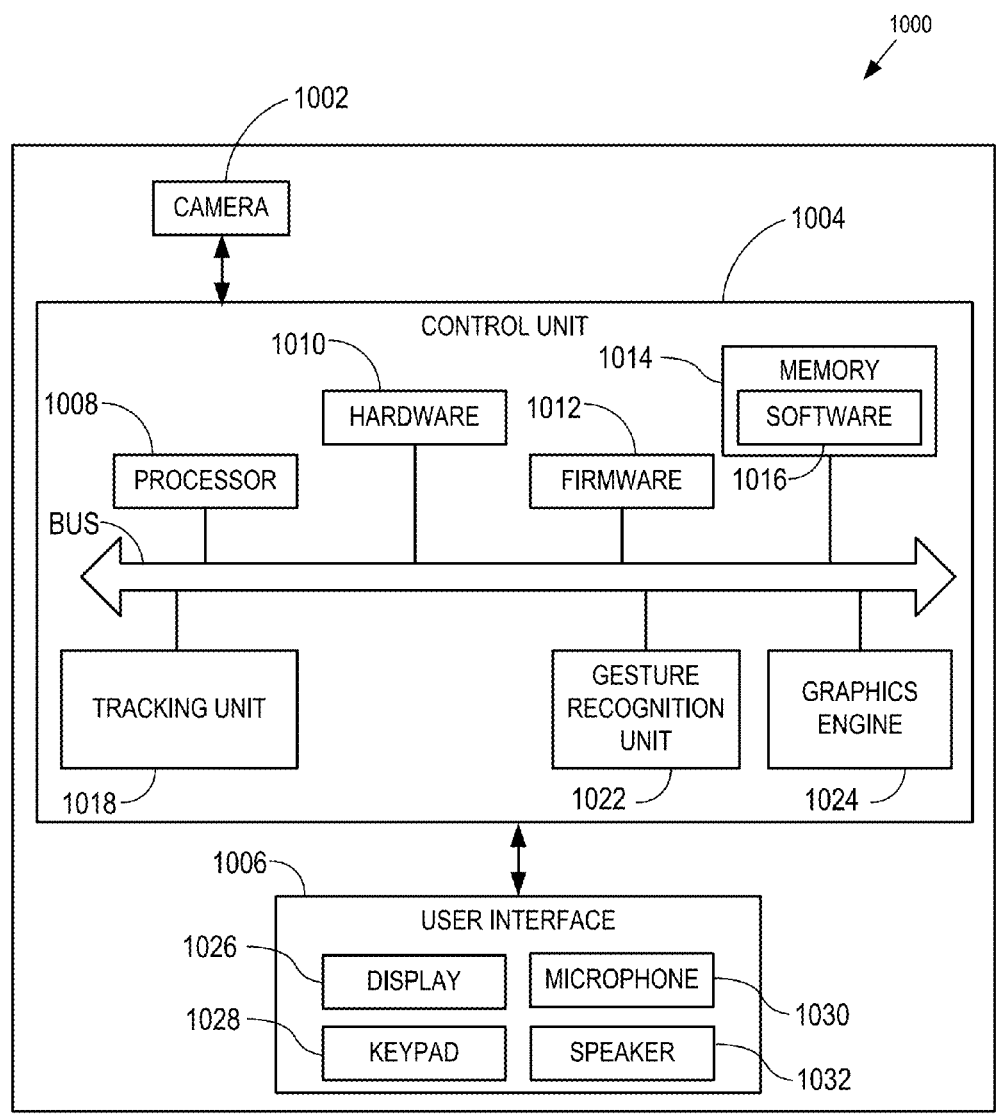
FIG. 10 is a functional block diagram illustrating a mobile platform capable of receiving user input via a front-facing camera.

FIG. 10 is a functional block diagram illustrating a mobile platform 1000 configured for recognizing temporal patterns. The mobile platform 1000 is one possible implementation of the mobile platform 100 of FIGS. 1A and 1B. The mobile platform 1000 includes a camera 1002 as well as a user interface 1006. The user interface 1006 includes a display 1026, which may be configured for displaying preview images captured by the camera 1002, as well as alphanumeric characters, as described above. The user interface 1006 may also include a keypad 1028 through which the user can input information to the mobile platform 1000. If desired, the keypad 1028 may be obviated by utilizing a camera 1002 as described above. In addition, in order to provide the user with multiple ways to provide a spatio-temporal pattern, for example, in some aspects, the mobile platform 1000 may include a touch sensor to receive touch gesture input via the display 1026. The user interface 1006 may also include a microphone 1030 and a speaker 1032 (e.g., if the mobile platform is a cellular telephone).

The mobile platform 1000 includes a tracking unit 1018 that is configured to perform object-guided tracking. In one example, the tracking unit 1018 is configured to track movement of an object (e.g., fingertip, stylus, writing instrument or other object), as discussed above in order to generate trajectory data.

The mobile platform 1000 also includes a control unit 1004 that is connected to and communicates with the camera 1002 and user interface 1006, along with other features, such as the tracking unit 1018 and the gesture recognition unit 1022. The gesture recognition unit 1022 accepts and processes trajectory data received from the tracking unit 1018 in order to recognize user input as symbols and/or gestures. The control unit 1004 may be provided by a processor 1008 and associated memory 1014, hardware 1010, software 1016, and firmware 1012.

The control unit 1004 may further include a graphics engine 1024, which may be, e.g., a gaming engine, to render desired data in the display 1026, if desired. The tracking unit 1018 and gesture recognition unit 1022 are illustrated separately and separate from the processor 1008 for clarity, but may be a single unit and/or implemented in the processor 1008 based on instructions in the software 1016 which is run in the processor 1008. The processor 1008, as well as one or more of the tracking unit 1018, gesture recognition unit 1022, and graphics engine 1024 can, but need not necessarily include, one or more microprocessors, embedded processors, controllers, application specific integrated circuits (ASICs), advanced digital signal processors (ADSPs), and the like. The term processor describes the functions implemented by the system rather than specific hardware. Moreover, as used herein the term "memory" refers to any type of computer storage medium, including long term, short term, or other memory associated with the mobile platform 1000, and is not to be limited to any particular type of memory or number of memories, or type of media upon which memory is stored.

In one configuration, a machine learning model is configured for receiving training trajectories. The model is also configured for partitioning the area into observed clusters and a non-observed complementary cluster. The model is further configured for generating a spatio-temporal pattern model to include the observed clusters and the non-observed complementary cluster. The model includes a receiving means, partitioning means, and/or generating means. In one aspect, the receiving means, partitioning means, and/or generating means may be the general-purpose processor 302, program memory associated with the general-purpose processor 302, memory block 318, local processing units 402, and or the routing connection processing units 316 configured to perform the functions recited. In another configuration, the receiving means, partitioning means, and/or generating means may be implemented via processor 1008, hardware 1010, firmware 1012, and/or software 1016. In another configuration, the aforementioned means may be any module or any apparatus configured to perform the functions recited by the aforementioned means.

The processes described herein may be implemented by various means depending upon the application. For example, these processes may be implemented in hardware 1010, firmware 1012, software 1016, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

According to certain aspects of the present disclosure, each local processing unit 402 may be configured to determine parameters of the model based upon desired one or more functional features of the model, and develop the one or more functional features towards the desired functional features as the determined parameters are further adapted, tuned and updated.

Figure 11:
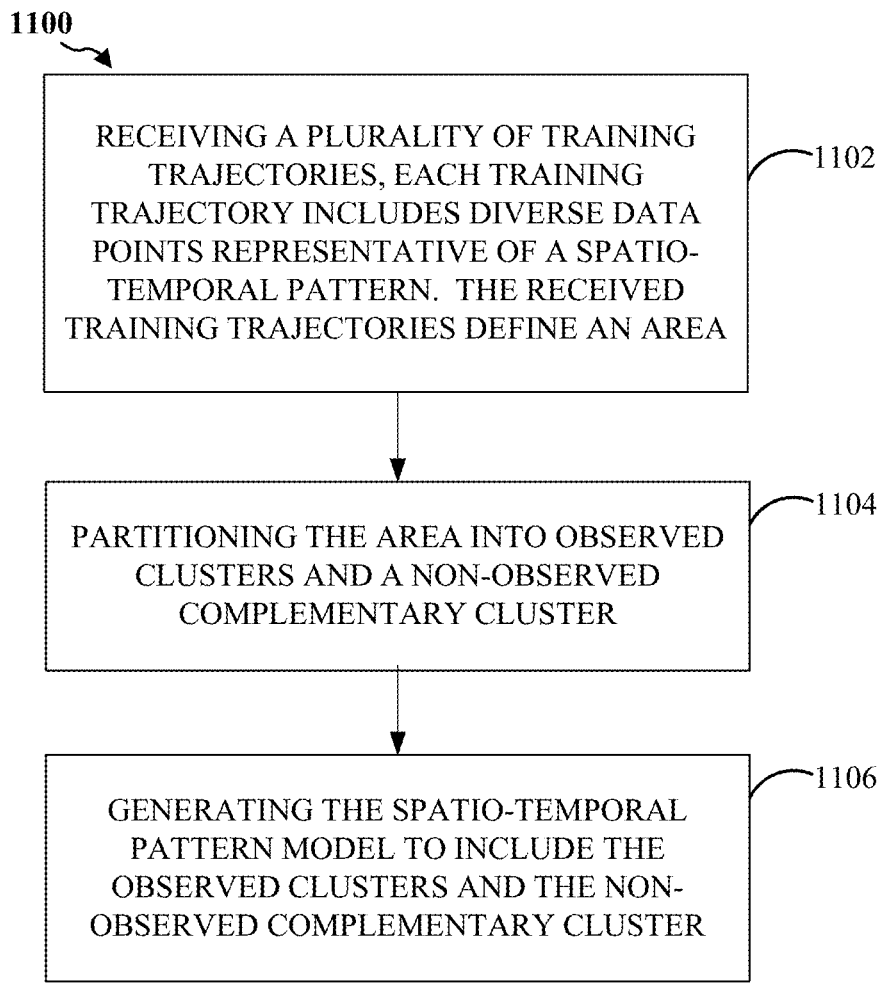
FIG. 11 is a flow diagram illustrating a method for generating a spatio-temporal pattern model for spatio-temporal pattern recognition in accordance with aspects of the present disclosure.

FIG. 11 illustrates a method 1100 for generating a spatio-temporal pattern model for spatio-temporal pattern recognition in accordance with aspects of the present disclosure. In block 1102, the process receives training trajectories. Each of the training trajectories may include diverse data points representative of a spatio-temporal pattern. The spatio-temporal pattern may, for example, comprise a camera input or an input gesture representative of at least one of an alphanumeric character, a symbol, a mouse/touch control. The received training trajectories define an area.

In block 1104, the process partitions the area into observed clusters and a non-observed complementary cluster. Furthermore, in block 1106, the process generates the spatio-temporal pattern model to include the observed clusters and the non-observed complementary cluster.

The area may be partitioned by applying a stochastic process such as a two parameter Pitman-Y or process, for example. In some aspects, a covariance regression, such as a Gaussian process covariance regression may be performed for two or more of the data points included in the training trajectories and may in turn be used to determine the one or more stochastic process parameters.

The stochastic process may be used to determine which cluster, including the non-observed complementary cluster, corresponds to each data point of a given trajectory. A range of each of the observed clusters may also be determined based on one or more stochastic process parameters. Additionally, the spatio-temporal pattern model may, in some aspects, be generated by creating a hidden Markov model (HMM) based on the stochastic process.

Furthermore, the process may modify an observation table of the HMM to include the non-observed complementary cluster. In still further aspects, the process may recognize a received trajectory as a spatio-temporal match when a likelihood of the hidden Markov model is above a predetermined threshold.

Figure 12:
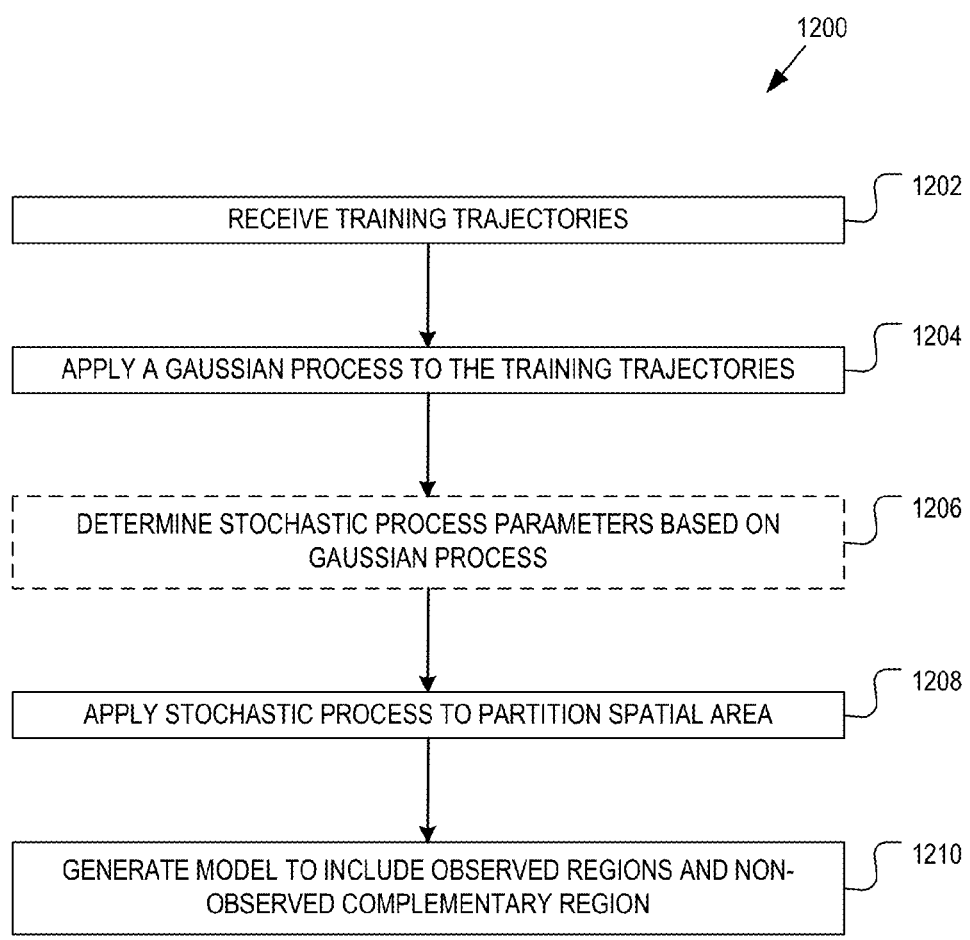
FIG. 12 is a flow diagram illustrating a process of generating a spatio-temporal pattern model in accordance with aspects of the present disclosure.

FIG. 12 is a flow diagram illustrating an exemplary process 1200 for generating a model for spatio-temporal pattern recognition, in accordance with aspects of the present disclosure. In block 1202, the process receives training trajectories (e.g., training trajectories 704A-C of FIG. 7A). Each of the training trajectories includes a spatially diverse data point representative of an input gesture. In block 1204, a Gaussian process (e.g., FIG. 7C) is then applied to the training trajectories and in optional process block 1206, the Gaussian process is used to determine a stochastic process parameter (e.g., parameter d of the Pitman-Y or process). As mentioned, process block 1206 is optional and may be omitted when training the model. Thus, in one example, the Gaussian process covariance regression is only used for recognition and not for training The stochastic process (e.g., Pitman-Y or process) is then applied in process block 1208 to partition a spatial area of the trajectories into observed regions and a non-observed complementary region. The range (e.g., size) of each of the observed regions may be based on the aforementioned stochastic process parameter. In block 1210 the process generates the model for spatio-temporal pattern recognition, which uses the observed regions and the non-observed complementary region to determine a pattern match.

Figure 13:
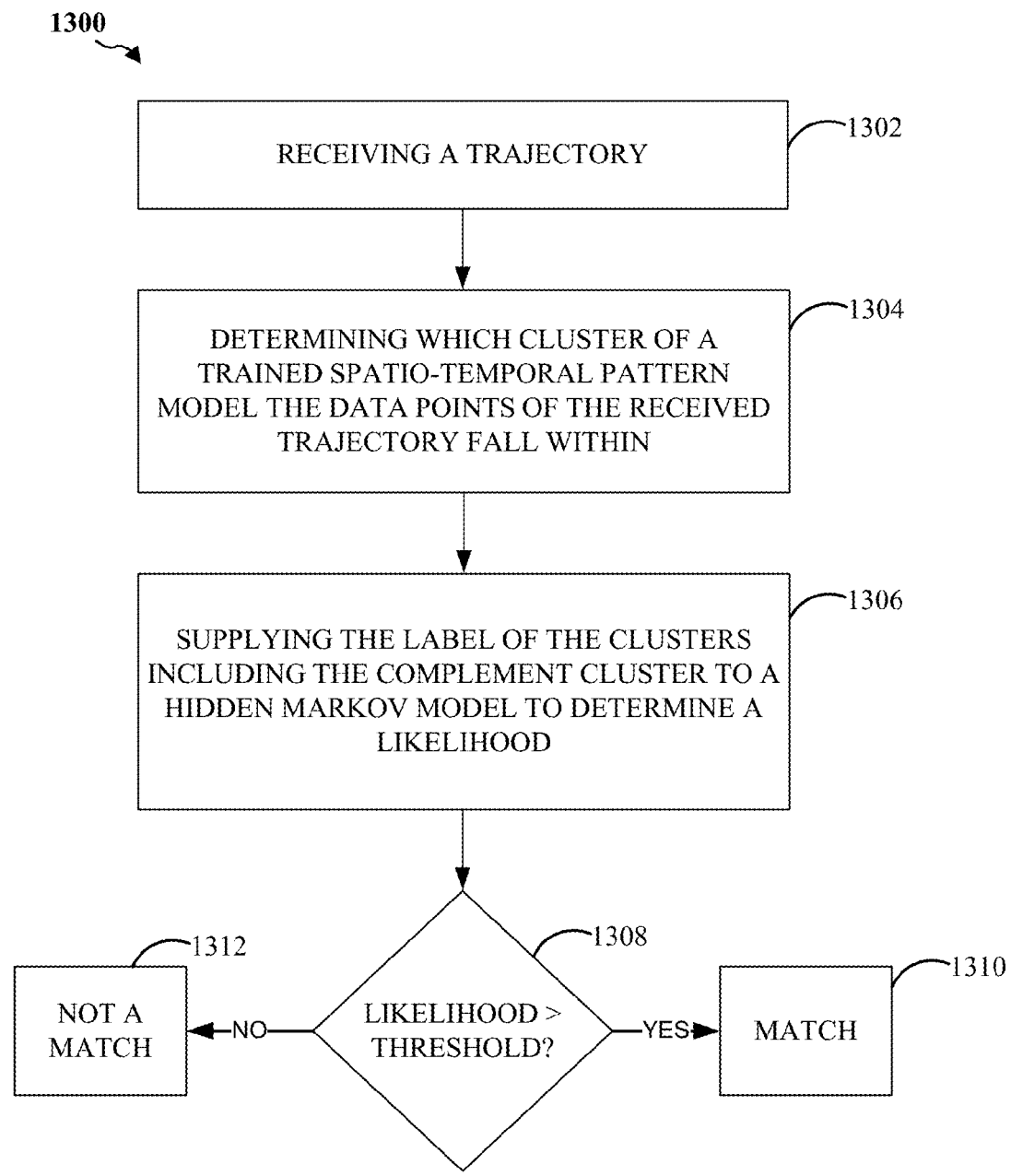
FIG. 13 is a flow diagram illustrating a method for spatio-temporal pattern recognition in accordance with aspects of the present disclosure.

FIG. 13 is a flow diagram illustrating a process 1300 of spatio temporal pattern recognition. In block 1302, the process receives a trajectory. The received trajectory may comprise data points. The data points of the trajectory may be related to an input gesture, stock market related data, speech, weather data or other spatio temporal data.

In block 1304, the process evaluates the received trajectory to determine which cluster (e.g., the observed cluster and the complement cluster) of a trained spatio-temporal pattern model, the data points of the received trajectory fall within. When a data point falls within an observed cluster, the process assigns a label. When the data point is within the complement cluster, the data point may not be acceptable. However, in accordance with aspects of the present disclosure, some variance may be tolerated.

In block 1306, the process finds the data points in each cluster and the complement cluster. Assigned labels for each cluster including the complement cluster may be supplied to a corresponding hidden Markov model to determine a likelihood. By considering the data points of the complement cluster, the likelihood produced by an HMM may be reduced.

Each HMM may output a likelihood value that may be compared to a threshold at block 1308. If the outputs are above a threshold, the received trajectory may be recognized as a spatio temporal match in block 1310. Otherwise, the received trajectory is not deemed a match, in block 1312.

In some aspects, the order of observation may also be evaluated. That is, in some aspects, the HMM may be trained with the correct order of observation and may be used to evaluate the spatio-temporal pattern. For example, if an HMM is trained with a correct order for drawing the digit 2, if a digit 2 is drawn in a reverse order, the likelihood generated by the HMM may be very small and thus, may indicate that the input is not a match.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints.

The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of generating a spatio-temporal pattern model for spatio-temporal pattern recognition, the method comprising:
receiving a plurality of training trajectories in a spatial area, each training trajectory including a plurality of diverse data points representative of a spatio-temporal pattern;
partitioning the spatial area into a plurality of observed clusters and an unpopulated complementary cluster, each observed cluster comprising a set of diverse data points from the plurality of diverse data points, and the unpopulated complementary cluster devoid of the plurality of diverse data points that are representative of the spatio-temporal pattern; and
generating the spatio-temporal pattern model to include the plurality of observed clusters and the unpopulated complementary cluster.

2. The method of claim 1, in which the spatial area is partitioned by applying a stochastic process, and
a range of each of the plurality of observed clusters is determined based on one or more stochastic process parameters.

3. The method of claim 2, in which the stochastic process is a Dirichlet process mixture model.

4. The method of claim 2, in which the stochastic process is a two-parameter Pitman-Yor process.

5. The method of claim 2, in which generating the spatio-temporal pattern model includes creating a hidden Markov model based on the stochastic process.

6. The method of claim 5, further comprising modifying an observation table of the hidden Markov model to include the unpopulated complementary cluster.

7. The method of claim 5, further comprising recognizing a received trajectory as a spatio-temporal match when a likelihood of the hidden Markov model is above a predetermined threshold.

8. The method of claim 7, further comprising using the stochastic process to determine which cluster, including the unpopulated complementary cluster, corresponds to each data point of the received trajectory.

9. The method of claim 2, further comprising determining a covariance regression for at least two of the plurality of diverse data points included in the plurality of training trajectories and using the determined covariance regression to determine the one or more stochastic process parameters.

10. The method of claim 9, in which the covariance regression comprises a Gaussian process covariance regression.

11. The method of claim 1, in which the spatio-temporal pattern comprises an input gesture representative of at least one of an alphanumeric character, a symbol, or a mouse/touch control.

12. An apparatus for generating a spatio-temporal pattern model for spatio-temporal pattern recognition, the apparatus comprising:
- a memory; and
- at least one processor coupled to the memory, the at least one processor configured:
  - to receive a plurality of training trajectories in a spatial area, each training trajectory including a plurality of diverse data points representative of a spatio-temporal pattern;
  - to partition the spatial area into a plurality of observed clusters and an unpopulated complementary cluster, each observed cluster comprising a set of diverse data points from the plurality of diverse data points, and the unpopulated complementary cluster devoid of the plurality of diverse data points that are representative of the spatio-temporal pattern; and
  - to generate the spatio-temporal pattern model to include the plurality of observed clusters and the unpopulated complementary cluster.

13. The apparatus of claim 12, in which the at least one processor is further configured to partition the spatial area by applying a stochastic process, and
- to determine a range of each of the plurality of observed clusters based on one or more stochastic process parameters.

14. The apparatus of claim 13, in which the stochastic process is a Dirichlet process mixture model.

15. The apparatus of claim 13, in which the stochastic process is a two-parameter Pitman-Yor process.

16. The apparatus of claim 13, in which the at least one processor is further configured to generate the spatio-temporal pattern model by creating a hidden Markov model based on the stochastic process.

17. The apparatus of claim 16, in which the at least one processor is further configured to modify an observation table of the hidden Markov model to include the unpopulated complementary cluster.

18. The apparatus of claim 16, in which the at least one processor is further configured to recognize a received trajectory as a spatio-temporal match when a likelihood of the hidden Markov model is above a predetermined threshold.

19. The apparatus of claim 18, in which the at least one processor is further configured to utilize the stochastic process to determine which cluster, including the unpopulated complementary cluster, corresponds to each data point of the received trajectory.

20. The apparatus of claim 13, in which the at least one processor is further configured to determine a covariance regression for at least two of the plurality of diverse data points included in the plurality of training trajectories and to use the determined covariance regression to determine the one or more stochastic process parameters.

21. The apparatus of claim 20, in which the covariance regression comprises a Gaussian process covariance regression.

22. The apparatus of claim 12, in which the spatio-temporal pattern comprises an input gesture representative of at least one of an alphanumeric character, a symbol, or a mouse/touch control.

23. An apparatus for generating a spatio-temporal pattern model for spatio-temporal pattern recognition, the apparatus comprising:
- means for receiving a plurality of training trajectories in a spatial area, each training trajectory including a plurality of diverse data points representative of a spatio-temporal pattern;
- means for partitioning the spatial area into a plurality of observed clusters and an unpopulated complementary cluster, each observed cluster comprising a set of diverse data points from the plurality of diverse data points, and the unpopulated complementary cluster devoid of the plurality of diverse data points that are representative of the spatio-temporal pattern; and
- means for generating the spatio-temporal pattern model to include the plurality of observed clusters and the unpopulated complementary cluster.

24. A non-transitory computer readable medium having encoded thereon program code for generating a spatio-temporal pattern model for spatio-temporal pattern recognition, the program code being executed by a processor and comprising:
- program code to receive a plurality of training trajectories in a spatial area, each training trajectory including a plurality of diverse data points representative of a spatio-temporal pattern;
- program code to partition the spatial area into a plurality of observed clusters and an unpopulated complementary cluster, each observed cluster comprising a set of diverse data points from the plurality of diverse data points, and the unpopulated complementary cluster devoid of the plurality of diverse data points that are representative of the spatio-temporal pattern; and
- program code to generate the spatio-temporal pattern model to include the plurality of observed clusters and the unpopulated complementary cluster.

* * * * *